Patented Oct. 17, 1922.

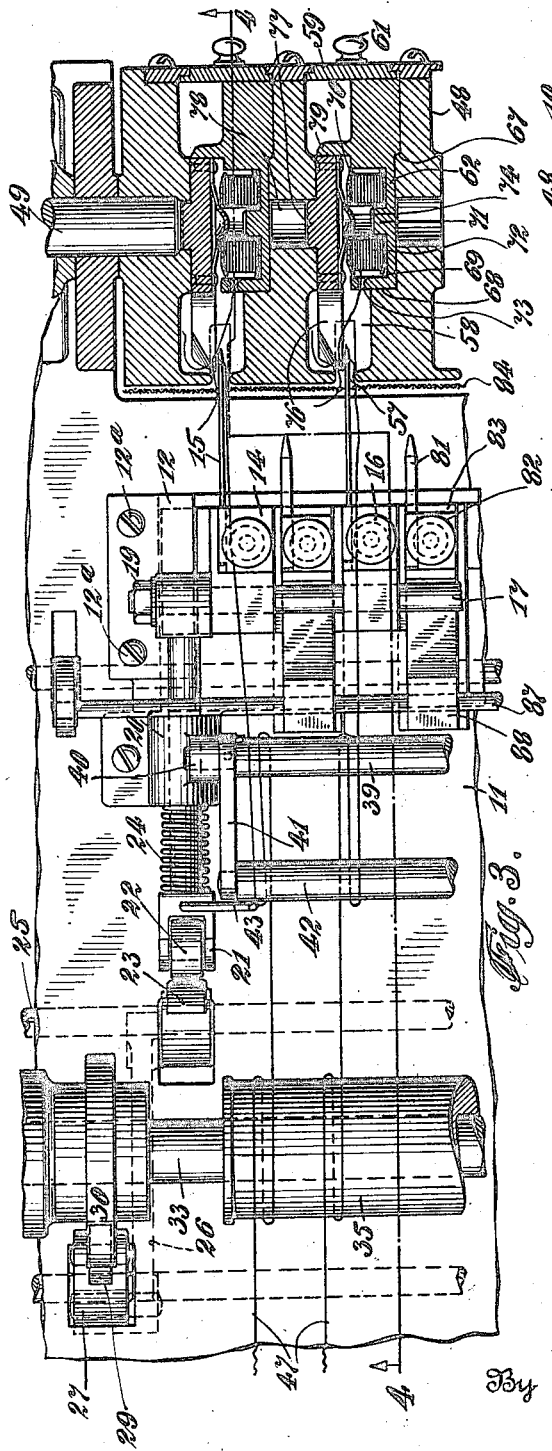

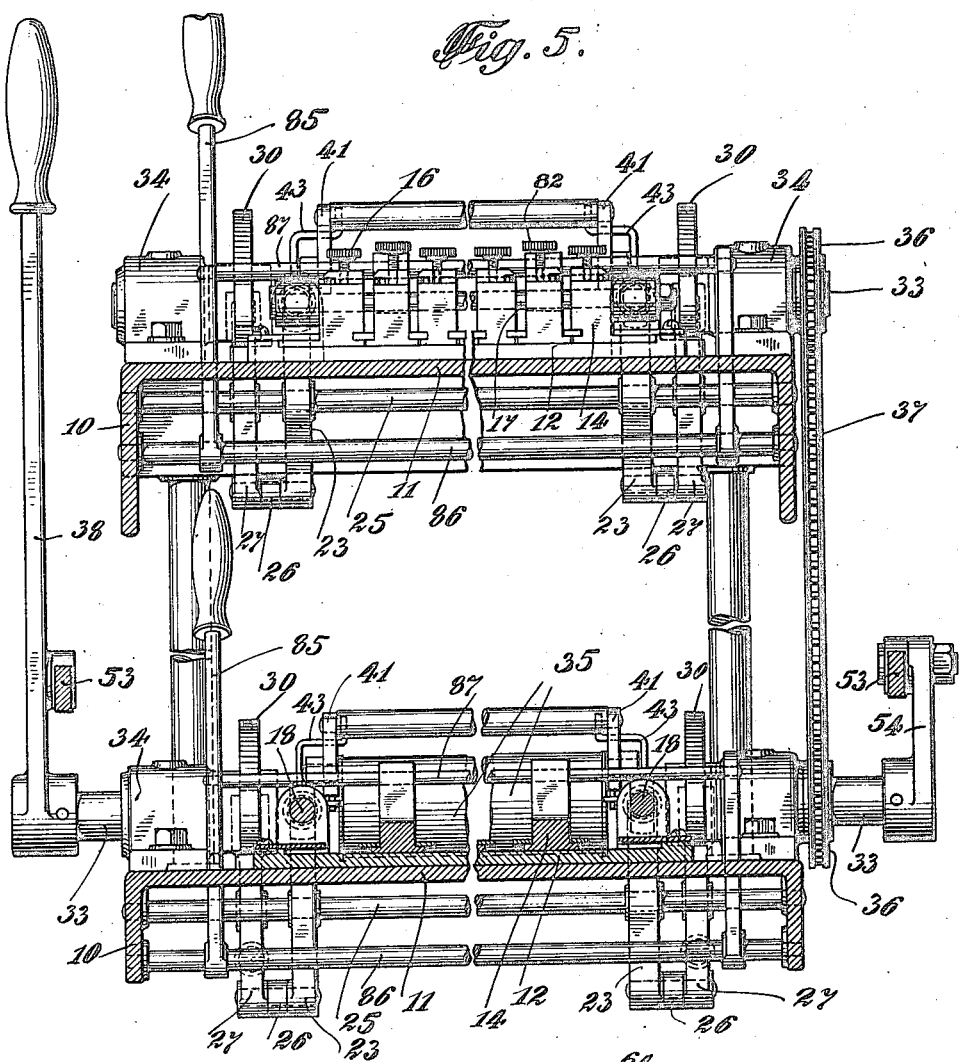

1,432,608

UNITED STATES PATENT OFFICE.

JOHN NEFF, SR., OF WEST HOBOKEN, NEW JERSEY.

EMBROIDERY MACHINE.

Application filed May 6, 1920. Serial No. 379,258.

*To all whom it may concern:*

Be it known that I, JOHN NEFF, Sr., a citizen of the United States, and resident of West Hoboken, in the county of Hudson and State of New Jersey, have invented certain new and useful Improvements in Embroidery Machines, of which the following is a specification.

My invention relates to embroidery machines and has for its object to provide a machine of simple construction and efficient operation whereby embroidering may be automatically performed without requiring any particular skill on the part of the operator. A further object of my invention is to construct the embroidery machine with an improved and simplified looper mechanism whereby the operation and the substitution of one bobbin-case for another is greatly facilitated. Other objects will appear from the description hereinafter and the features of novelty will be pointed out in the appended claims.

Figure 1:
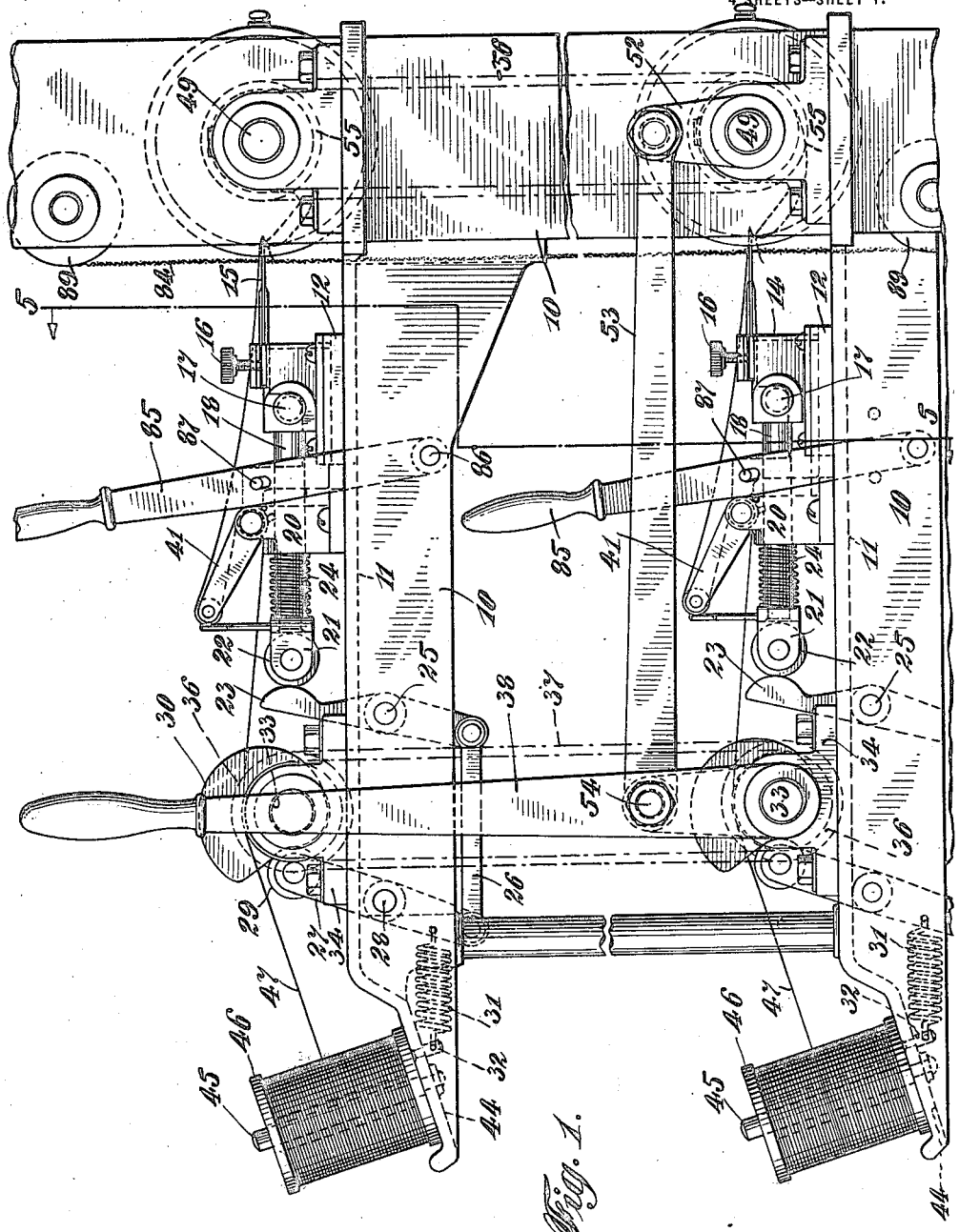
Figure 2:
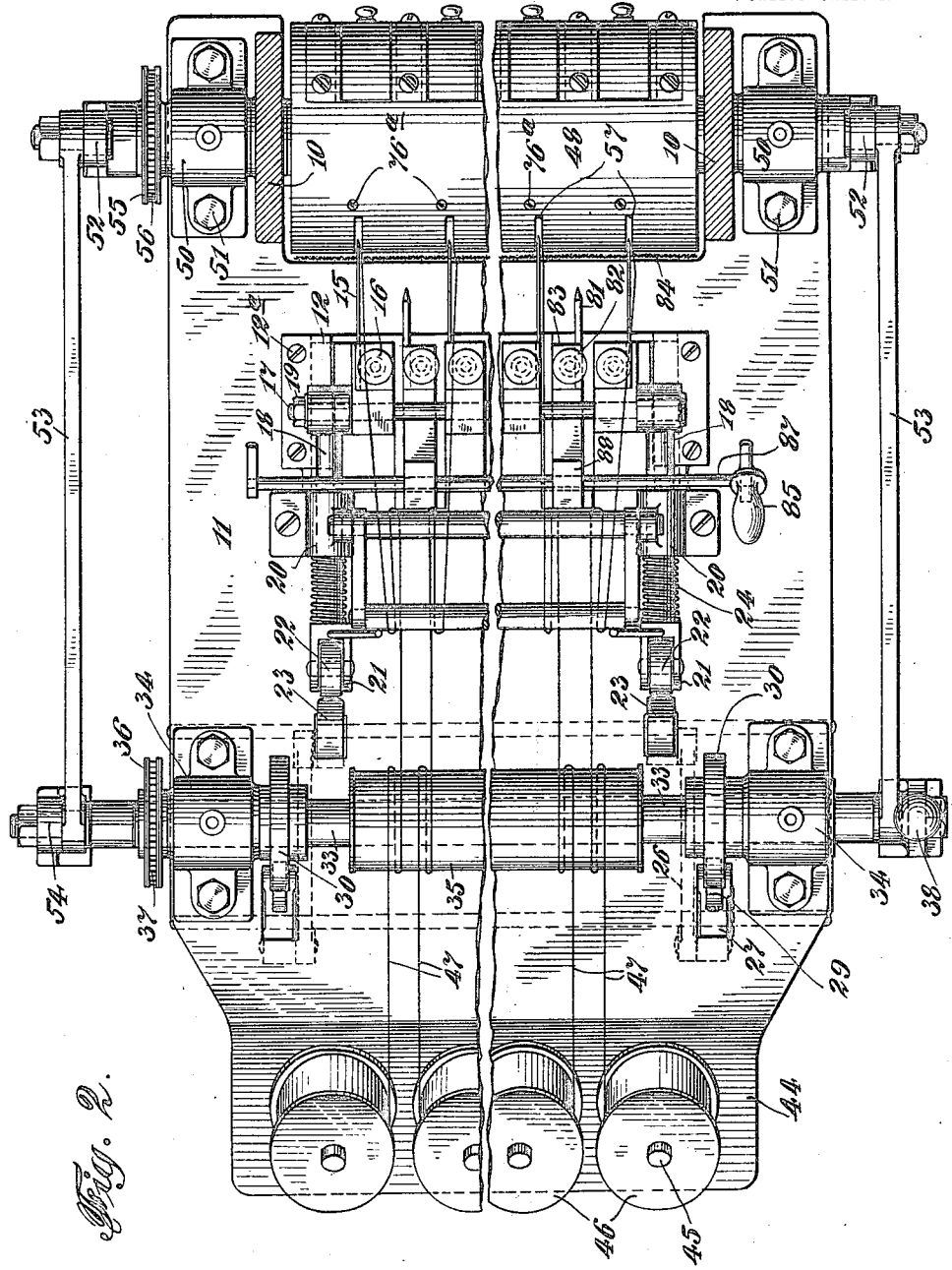

In the accompanying drawings, which for illustrative and descriptive purposes show an example of my invention without defining its limits, Fig. 1 is a side elevation of the machine; Fig. 2 is a plan view thereof, Fig. 3 is a fragmentary plan view partly in section; Fig. 4 is a sectional elevation on the line 4—4 of Fig. 3; Fig. 5 is a cross-section on the line 5—5 of Fig. 1; Fig. 6 is a perspective view of the hook or looper and Fig. 7 is a similar view, partly broken away, of the bobbin-case.

In its illustrated form the machine comprises a supporting frame 10, including a plurality of superimposed tables 11 each of which carries a guidplate 12 secured in place in any suitable manner as by screws 12ª. The guideplate 12 is constructed with a series of duplicate guideways 13 in which needle carriers 14 are slidably mounted as shown in Figs. 3 and 4; the needles 15 are removably secured in said carriers 14 in any convenient manner as by means of set screws 16. The carriers 14 are connected to to move in unison by means of a rod 17 upon the projecting free ends of which plungers 18 are pivotally mounted and held in place by means of a nut 19; the plungers 18 pass through and are slidable in bearings 20 which may comprise integral parts of the guideplates 12 as shown in the drawings. The plungers 18 are provided with forks 21 in which rollers 22 are journalled, the latter being maintained in engagement with levers 23 by means of springs 24 located between and bearing against the forks 21 and the bearings 20. The levers 23 are pivoted at 25 upon the frame 10 and are connected by means of links 26 with arms 27 carrying rollers 29 which are maintained in operative contact with suitable cams 30 by the action of springs 31 secured at one end to said arms 27 and at the other end to stationary projections 32. The cams 30 are mounted in co-operating pairs upon shafts 33 journalled in suitable bearings 34 fastened upon the tables 11, said shafts carrying drums 35, the purpose of which will appear more fully hereinafter.

When the machine is arranged in duplicate superimposed units or tiers as in the illustrated example, the shafts 33 are provided in addition with sprocket wheels 36 connected by means of sprocket chains 37 whereby the shafts 33 are all operated in unison, it being understood that the sprocket wheels and chains may be replaced by other means whereby equivalent results are obtained.

In its illustrated form the machine is shown as hand operated and is provided with an operating hand lever 38 secured upon one or the other of the shafts 33 and adapted to be oscillated back and forth in the operation of the machine as will be more fully pointed out hereinafter.

The machine includes suitable take-up devices which may consist of rods 39 journalled in lugs 40 extending upwardly from the bearings 20, said rods 39 carrying upwardly inclined members 41 which rotatably support rollers 42; the latter rest against pins 43 which project upwardly from the plungers 18 and partake of the movements thereof. As shown in Figs. 1 and 2 the tables 11 are continued at one edge in the form of inclined extensions 44 upon which spindles 45 are located, it being understood that the number of spindles in each case corresponds to the number of needles 15. Spools 46 are mounted upon said spindles 45 and carry a supply of thread which constitutes the needle thread 47; the latter passes from the spools 46 around the drums 35, then under and over the rods 39 and then under and over the rollers 42 and to the needles 15 through the eyes of which said needle thread is threaded in the customary manner.

In addition to the parts so far described the machine includes cylinders 48 which extend transversely thereof in directions parallel to the shafts 33 said cylinders being located one above the other and carried by trunnions 49 journalled in bearings 50 fastened upon the tables 11 in any convenient manner as by bolts 51. It will be understood that the cylinders 48 correspond in number to the number of series of superimposed needles 15 and that said cylinders are arranged to be rocked in unison with each other and in proper synchronism with the rest of the machine. Any convenient mechanism may be utilized to bring about this result; for instance as shown in the drawings the trunnions 49 of one cylinder may be extended beyond the bearings 50 and provided with cranks 52 connected by means of links 53 with a co-operating crank 54 located on one of the shafts 33 and with the lever 38 as shown in Figs. 1 and 2. To operatively connect one cylinder 48 with another the trunnions may carry sprockets 55 connected by means of sprocket chains 56 as illustrated in Fig. 1.

The cylinders 48 are each provided with circumferential slots 57 located in registry with the needles 15 as shown in Figs. 3 and 4 and communicating with shuttle chambers 58 into which said cylinders are divided and which are closed by means of circumferential slides 59 slidable in guides 60 by means of handles 61. The chambers 58 are adapted to contain the bobbin cases 62 which are constructed as shown in Figs. 4 and 7 with radial extensions 63 having parallel flat side surfaces 64 fitting between corresponding surfaces 65 in said chambers as shown in Fig. 4. The extensions 63 are further formed with curved end surfaces 66 arranged to fit against the inner surfaces of the slides 59 and with curved shoulders 67 and end surfaces 68 engaging co-operating shoulders in said chambers as shown in Fig. 3. With their arrangement each bobbin case 62 is fixed in its chamber 58 so as to partake of the rocking movements of the cylinder 48 by which it is carried and yet is easily removable from said chamber when for any reason this is desired.

The bobbin cases 62 include recesses 69 in which bobbins 70 are rotatably mounted upon studs 71 as shown in Fig. 3, the bobbins carrying the looper threads 72 which pass out through eyelets 73 in said bobbin-cases. The bobbins 70 are maintained in their respective recesses 69 by means of springs 74 which are provided upon the bodies 75 of loopers or thread hooks 76 as shown in Figs. 3 and 6, said springs at the same time holding said bobbins and consequently the looper threads 72 under the necessary tension to insure efficiency of operation. The bodies 75 of the loopers 76 are provided with axial lugs 77 which fit into axial openings 78 in the cylinders 48 and are held therein by the action of the springs 74; the bobbin cases 62 are formed with curved flanges 79 which extend over the bodies 75 of the loopers 76 and assist to maintain the latter in proper operative combination with said bobbin cases. To maintain the hooks or loopers 76 against longitudinal and circumferential movement relatively to the cylinders 48, the latter are provided with set screws 76$^a$, the ends of which enter suitable openings 75$^a$ located at the proper points upon the bodies 75 as shown in Fig. 6. With the described arrangement the bobbin cases 62 and loopers 76 may be readily separated when it is desired for instance to replace one bobbin with another and yet, when in position in the machine, are in the form of units which are firmly connected with the cylinders to partake of the rocking movements thereof. The loopers 76 and the chambers 58 are provided with co-operating surfaces 80 whereby circumferential movement of the loopers 76 relatively to the bobbin cases 62 and to the cylinders 48 is prevented.

In order to increase the efficiency of the machine it may be provided with borers 81 arranged in superimposed series and secured by set screws 82 in blocks 83 slidably mounted in guides similar to and located between the guides 13 in which the needle carriers 14 are slidable. The borers 81 are adapted to punch holes in the fabric 84 being embroidered and each series thereof is preferably capable of independent operation so that the location of the holes may be determined as required. In the illustrated example the means whereby this is accomplished comprises hand levers 85 pivoted at 86 upon the frame 10 and connected with rods 87 which pass through upright projections 88 carried by the blocks 83 as shown in Fig. 2.

The fabric 84 may be supported upon suitable rollers 89 mounted on the frame and controlled by means of pantograph mechanism of any well known type whereby the design to be embroidered is predetermined; as this pantograph mechanism forms no part of the present invention it has not been illustrated.

In operation the lever 38 is manually oscillated, in one direction and thus rocks the shaft 33 upon which it is mounted, the movement being communicated to the other shaft or shafts 33 included in the machine, by means of the sprocket chain or chains 37 and the sprocket wheels 36 so that all of said shafts simultaneously describe the same movements. The described actuation of said shafts 33 correspondingly operates the cams 30 which at this stage permit the springs 31 to impart pivotal movements to the arms 27 and to the levers 23, through the medium of the links 26 as shown in Figs. 1 and 4. The levers 23 in turn slidably move the plungers 18 against the tension of the springs 24 whereby the needle carriers 14 are shifted, in the guideways 13, to the right in Figs. 1, 3, and 4 and thereby cause the needles 15 to penetrate the fabric 84 and project through the slots 57 into the chambers 58 of the cylinders 48, the character and extent of movement of all of the needles being the same. This operation carries the needle threads 47 through the fabric 84 into the paths of the hooks 76, the take-up devices being actuated through the medium of the pins 43 and rollers 42 as shown in Fig. 4 to relieve the tension on said needle threads to permit the above operation.

As the above operations take place the one cylinder 48 is rocked in its bearings by means of the cranks 52 and links 53 and its movement communicated to the other cylinders 48 through the medium of the sprocket wheels 55 and sprocket chains 56. The hooks 76 which are held against rotation relatively to the cylinders 48 by the set screws 76ª, are thereby all coincidentally caused to describe circular paths and to pass through the loops formed by the needle threads 47 at the rear of the fabric 84 whereby the looper or bobbin threads 72 are combined and interlocked with the needle threads 47 in the well known way. After this has occurred an oscillation of the lever 38 in the opposite direction and a consequent return movement of the cams 30 causes the latter to pivotally swing the arms 27 to the left in Fig. 1, this movement being communicated to the levers 23 and swinging the upper ends thereof away from the rollers 22 of the plungers 18. The latter, by the action of the springs 24 are caused to follow said levers 23 and to slide to the left in Fig. 1 whereby the needle carriers 14 are similarly moved to withdraw the needles 15 from the fabric. As this return movement of the parts takes place the take-up rollers 42 describe downward movements as the pins 43 are shifted to the left and thus draw the needle threads 47 taut in the fabric to complete the chain stitches. These operations are repeated through the continued oscillation of the lever 38, the fabric 84 being meanwhile shifted by the aforesaid pantograph mechanism whereby the predetermined design is embroidered on the fabric and duplicated thereon as many times as there are banks of needles and cylinders with their co-operating parts in the machine.

When it is desired to include eyelets of the conventional type in the design the borers 81 are operated at the proper times by swinging the levers 85 whereby the blocks 83 are slidably moved in their guides to cause the borers 81 to penetrate the fabric 84; each series of borers 81 is independently actuated by its own lever 85 and is withdrawn to normal position by swinging said levers 85 to the left in the drawings. The resulting eyelets may be stitched or finished in any well known way.

The operation of the machine requires only relatively short forward and backward movements of the lever 38 so that high speed and maximum efficiency may be attained with a minimum of effort on the part of the operator. The mechanism is so synchronized and timed that the needles 15 and hooks 76 will all operate in harmony to bring about the desired interlocking of the needle threads 47 and looper threads 72 in the form of chain stitches whereby the embroidering is efficiently and uniformly carried on. The circumferential slots 57 in the cylinders 48 permit the required rocking of said cylinders and reciprocation of the needles 15 without interference with each other. The cams 30 may be so shaped that the needles 15 after penetrating the fabric 84 will temporarily occupy positions of rest prior to their withdrawal to normal positions, to permit the hooks 76 to properly interlock the looper and needle threads.

The bobbin cases 62 are made readily accessible by moving the slides 59 to their open positions and may be easily and quickly removed from and replaced in the cylinder chambers 58; as previously stated the loopers or hooks 76 are held in the chambers 58 against rotation relatively to the cylinders 48 by set screws 76ª which are easily removed when it is desired for any reason to take one or more of said loopers out of said chambers.

The machine is simple in construction and efficient in operation and does away with the customary mechanism in which the parts describe movements of large extent. If desired the machine may be power driven instead of being manually operated as shown and may comprise as many contiguous units as desired.

Various changes in the specific form shown and described may be made within the scope of the claims without departing from the spirit of my invention.

I claim:—

1. An embroidering machine comprising a rotatable cylinder provided with a slotted chamber, a bobbin case in said chamber, a looper contiguous to said bobbin case in said chamber, said bobbin case and looper being fixed in said cylinder and partaking positively of the rotative movements thereof, a needle carrier reciprocable toward and away from said cylinder, a needle carried thereby and arranged to project through said slot into said chamber and means for reciprocating said carrier and needle and for simultaneously rocking said cylinder.

2. An embroidering machine comprising a rotatable cylinder having a plurality of adjacent, slotted chambers, bobbin cases in said chambers, loopers in said chambers contiguous to said bobbin cases, means whereby said bobbin cases and loopers are fixed in said cylinders and caused to positively partake of the rotative movements thereof, a plurality of needle carriers located in front of said cylinder and reciprocable toward and away from the same, needles mounted upon said carriers and arranged to project through said slots into said chambers and means for simultaneously reciprocating all of said carriers and needles and for simultaneously rocking said cylinder.

3. An embroidering machine comprising a support including a plurality of superimposed tables, a series of needle carriers slidably mounted on said tables, needles mounted upon said carriers, spring pressed plungers operatively connected with each series of carriers, superimposed shafts rotatably mounted upon said tables and operatively connected with each other, cams on said shafts, connected levers pivotally mounted on said support in operative relation to said cams and plungers whereby the latter are actuated by the action of said cams, cylinders rotatably mounted upon said tables and provided with slotted chambers, means whereby said cylinders are operatively connected with each other and with one of said shafts, bobbin cases in said chambers, loopers in said chambers contiguous to said bobbin cases, means whereby said bobbin cases and loopers are caused to partake of the movements of said cylinders and a hand lever connected with one of said shafts whereby all of said shafts are rocked to simultaneously reciprocate all of said carriers and needles and for simultaneously rocking all of said cylinders.

4. In an embroidering machine, a rotatable cylinder having a plurality of chambers, bobbin cases removably fitted in said chambers to move with said cylinders, bobbins carried by said bobbin cases, loopers removably secured in said chambers adjacent to said bobbin cases, springs carried by said loopers and bearing against said bobbins to retard the rotation thereof and slides whereby said chambers are closed.

5. In an embroidering machine the combination of a bobbin case having a recess, a bobbin rotatably mounted in said recess, a looper having a body located alongside of said bobbin case and extending over said recess and a spring carried by said looper and projecting outwardly from a surface of its body, said spring engaging said bobbin to retard the rotation thereof.

6. In an embroidering machine a looper having a body whereby it is secured in operative position for rotative reciprocation about a given axis and a spring located on one face of said body in registry with the axis thereof and exerting tension in the direction of said axis.

7. An embroidering machine comprising a plurality of superimposed needle carriers, needles mounted thereon, superimposed, rotatable cylinders having chambers, combined bobbin cases and loopers fixed in said chambers, and partaking positively of the rotative movements of said cylinder and means for simultaneously reciprocating all of said carriers and needles and for simultaneously rocking said cylinders.

Signed at West Hoboken, in the county of Hudson and State of New Jersey, this 30th day of April, A. D. 1920.

JOHN NEFF, Sr.